United States Patent
Beard et al.

(10) Patent No.: US 10,400,951 B2
(45) Date of Patent: Sep. 3, 2019

(54) DUNNAGE BAG SUSPENDER

(71) Applicant: Signode Industrial Group LLC, Glenview, IL (US)

(72) Inventors: Anthony K. Beard, Poyen, AR (US); Joseph W. Gault, Sheridan, AR (US)

(73) Assignee: Signode Industrial Group LLC, Glenview, IL (US)

( * ) Notice: Subject to any disclaimer, the term of this patent is extended or adjusted under 35 U.S.C. 154(b) by 0 days.

(21) Appl. No.: 15/959,891

(22) Filed: Apr. 23, 2018

(65) Prior Publication Data

US 2018/0320818 A1    Nov. 8, 2018

Related U.S. Application Data

(60) Provisional application No. 62/500,133, filed on May 2, 2017.

(51) Int. Cl.
| | |
|---|---|
| *F16M 13/04* | (2006.01) |
| *B60P 7/06* | (2006.01) |
| *F16M 13/02* | (2006.01) |
| *B65D 81/05* | (2006.01) |

(52) U.S. Cl.
CPC ............ *F16M 13/04* (2013.01); *B60P 7/065* (2013.01); *F16M 13/022* (2013.01); *B65D 81/052* (2013.01)

(58) Field of Classification Search
CPC ....... F16M 13/04; F16M 13/022; B60P 7/065; B65D 81/052
USPC ........................................................ 410/119
See application file for complete search history.

(56) References Cited

U.S. PATENT DOCUMENTS

| | | | | |
|---|---|---|---|---|
| 2,674,206 | A * | 4/1954 | William ................. | B60P 7/065 114/75 |
| 2,990,070 | A | 6/1961 | Cushman | |
| 3,028,981 | A | 4/1962 | Ford et al. | |
| 3,072,270 | A | 1/1963 | Tolby et al. | |
| 3,131,648 | A * | 5/1964 | Seger ..................... | B60P 7/065 206/522 |
| 3,145,853 | A | 8/1964 | Langenberg | |
| 3,177,816 | A * | 4/1965 | Daberkow ............. | B60P 7/065 137/226 |
| 3,199,689 | A | 8/1965 | Feldkamp | |
| 3,427,997 | A * | 2/1969 | Brown, Jr. ............. | B60P 7/065 410/119 |

(Continued)

FOREIGN PATENT DOCUMENTS

| | | | | |
|---|---|---|---|---|
| CA | 2915569 A1 * | 12/2014 | .......... | B65D 81/052 |
| DE | 1866986 | 2/1963 | | |

(Continued)

OTHER PUBLICATIONS

European Patent Office as International Searching Authority, International Search Report and Written Opinion for co-pending application No. PCT/US2018/029154, dated Aug. 6, 2018 (10 pages).

*Primary Examiner* — Hilary L Gutman
(74) *Attorney, Agent, or Firm* — Neal, Gerber & Eisenberg LLP

(57) ABSTRACT

Various embodiments of the present disclosure provide a dunnage bag suspender configured to suspend a dunnage bag in place before inflation and to hold the dunnage bag such that the dunnage bag can automatically pull free of the dunnage bag suspender during inflation.

20 Claims, 9 Drawing Sheets

(56) References Cited

U.S. PATENT DOCUMENTS

| | | | |
|---|---|---|---|
| 3,442,402 A | 5/1969 | Baxter | |
| 3,554,135 A | 1/1971 | Duvall et al. | |
| 3,643,268 A | 2/1972 | Stamberger | |
| 3,667,625 A | 6/1972 | Lucas | |
| 3,722,429 A * | 3/1973 | Holt | B61D 45/008 410/125 |
| 3,747,954 A * | 7/1973 | Enochian | B60P 1/60 410/125 |
| 3,868,026 A | 2/1975 | Baxter | |
| 3,939,995 A | 2/1976 | Baxter | |
| 4,044,693 A | 8/1977 | Ramsey, Jr. | |
| 4,070,011 A * | 1/1978 | Glesser | B25B 5/006 269/45 |
| 4,102,364 A | 7/1978 | Leslie et al. | |
| 4,116,344 A | 9/1978 | Ziemba | |
| 4,136,788 A | 1/1979 | Robbins | |
| 4,232,788 A | 11/1980 | Roth | |
| 5,139,842 A | 8/1992 | Sewell | |
| 5,730,564 A | 3/1998 | Howlett, Jr. | |
| 5,788,438 A | 8/1998 | Goshorn et al. | |
| 5,868,534 A | 2/1999 | Goshorn et al. | |
| 5,908,275 A | 6/1999 | Howlett, Jr. et al. | |
| 6,095,732 A | 8/2000 | Howlett, Jr. et al. | |
| 6,149,362 A | 11/2000 | Berrier et al. | |
| 6,186,714 B1 | 2/2001 | Berrier et al. | |
| 6,220,800 B1 | 4/2001 | Elze et al. | |
| 6,386,247 B1 | 5/2002 | Elze et al. | |
| 6,432,495 B1 | 8/2002 | Berrier et al. | |
| 6,527,488 B2 | 3/2003 | Elze et al. | |
| 6,823,905 B1 | 11/2004 | Smith et al. | |
| D499,637 S | 12/2004 | Elze et al. | |
| 6,929,021 B2 | 8/2005 | Cavenagh | |
| 7,008,155 B2 | 3/2006 | Smith et al. | |
| 7,011,480 B2 | 3/2006 | Ahlert et al. | |
| 7,051,753 B1 | 5/2006 | Caires et al. | |
| 7,128,510 B2 | 10/2006 | Ahlert et al. | |
| 7,137,765 B1 | 11/2006 | Elze et al. | |
| 7,410,145 B1 | 8/2008 | Elze et al. | |
| 7,610,929 B2 | 11/2009 | Zielinski et al. | |
| 7,793,687 B2 | 9/2010 | Smith et al. | |
| 7,909,554 B2 | 3/2011 | Keenan et al. | |
| 8,235,632 B2 | 8/2012 | Keenan | |
| 9,505,334 B2 | 11/2016 | Maness et al. | |
| 9,545,872 B1 | 1/2017 | Wilson et al. | |
| 9,896,256 B2 | 2/2018 | Pansegrouw | |
| 9,915,365 B2 | 3/2018 | Pansegrouw | |
| 9,969,316 B2 | 5/2018 | Pansegrouw | |
| 2002/0136614 A1 | 9/2002 | Elze et al. | |
| 2004/0141824 A1 | 7/2004 | Ahlert et al. | |
| 2004/0181156 A1 | 9/2004 | Kingsford et al. | |
| 2006/0239791 A1 | 10/2006 | Morris | |
| 2009/0116927 A1 | 5/2009 | Keenan et al. | |
| 2012/0315105 A1 * | 12/2012 | Freeman | B60P 7/065 410/119 |
| 2017/0267156 A1 | 9/2017 | Beard et al. | |

FOREIGN PATENT DOCUMENTS

| | | | |
|---|---|---|---|
| DE | 1802773 A1 * | 7/1970 | B60P 7/065 |
| EP | 0 893 363 | 1/1999 | |
| EP | 0 978 461 | 2/2000 | |
| GB | 2 267 466 | 12/1993 | |
| WO | WO-9503232 A1 * | 2/1995 | B65D 81/052 |
| WO | 98/08011 | 2/1998 | |
| WO | 98/16767 | 4/1998 | |
| WO | 03/078251 | 9/2003 | |
| WO | 2008/110981 | 9/2008 | |

* cited by examiner

DUNNAGE BAG SUSPENDER

PRIORITY

This application claims priority to and the benefit of U.S. Provisional Patent Application No. 62/500,133, filed May 2, 2017, the entire contents of which are incorporated herein by reference.

FIELD

The present disclosure relates to a dunnage bag suspender, and more particularly to a dunnage bag suspender configured to suspend a dunnage bag in place before inflation.

BACKGROUND

Shipping companies use shipping containers to transport loads of goods over long distances via ship, rail, truck, or airplane. Shipping containers are large, usually metal boxes such as intermodal containers, rail cars, and over-the-road containers. To ship a load of palletized goods using a shipping container, the pallets of goods are first loaded into the interior of the shipping container, typically until the shipping container reaches a maximum weight limit or a maximum volume limit. In many cases the pallets of goods don't completely fill the interior of the shipping container, which means voids exist within the load (e.g., between the pallets of goods themselves) and/or between load and the interior walls of the shipping container (e.g., between the pallets of goods and the interior walls of the shipping container). If the voids aren't minimized or the load isn't secured against movement, the pallets of goods could shift during transit and collide with one another and the interior walls of the shipping container, damaging the goods (and the shipping container).

Inflatable dunnage bags are commonly used to stabilize the load in a shipping container. After some or all of the pallets of goods are loaded into the shipping container, an installer positions deflated dunnage bags in the voids within the load (e.g., between pallets of goods) and/or between the load and the interior walls of the shipping container (e.g., between the pallets of goods and the interior walls of the shipping container). The installer then inflates the dunnage bags to an operating pressure using a compressed air source, such as a pneumatic compressor. After inflation, the dunnage bags generally prevent the pallets of goods from moving relative to one another and relative to the shipping container while acting as cushions to dampen forces imparted during transit.

Positioning and inflating dunnage bags can be difficult when pallets of goods are stacked to the ceiling of the shipping container, especially considering that most intermodal containers have an internal height of more than 7½ feet. When using a dunnage bag to secure pallets of goods stacked to the ceiling of the shipping container, the dunnage bag is typically positioned such that its longitudinal midpoint is at or near the vertical midpoint of the load such that the dunnage bag does not contact the floor of the shipping container. This means that the dunnage bag must be suspended above the floor while being inflated. This typically requires multiple installers: one to suspend the dunnage bag in place and another to operate the inflator.

SUMMARY

Various embodiments of the present disclosure provide a dunnage bag suspender configured to suspend a dunnage bag in place before inflation and to hold the dunnage bag such that the dunnage bag can automatically pull free of the dunnage bag suspender during inflation.

In one embodiment, the dunnage bag suspender comprises a handle, a support, a suspender, and a dunnage bag attacher. The support extends transversely from the handle and has a support longitudinal axis. The suspender has a suspender longitudinal axis and is pivotably attached to the support such that the suspender is pivotable relative to the support between a stowed configuration and a use configuration. When the suspender is in the use configuration the suspender longitudinal axis is transverse to the support longitudinal axis. The dunnage bag attacher is attached to the support and configured to releasably attach to a dunnage bag such that the dunnage bag can pull free of the dunnage bag attacher during inflation.

In one embodiment, a method of using the dunnage bag suspender to install the dunnage bag in a space between a first portion of a load and a second portion of a load comprises: (1) moving the suspender from the stowed configuration to the use configuration; (2) releasably attaching the dunnage bag attacher to the dunnage bag; and (3) positioning the dunnage bag suspender such that the suspender rests a top surface of the first portion of the load and a top surface of the second portion of the load, the suspender extends across the space between the first and second portions of the load, and the dunnage bag is positioned in the space between the first and second portions of the load. In certain embodiments, the method also includes inflating the dunnage bag to a desired operating pressure, which causes the dunnage bag to pull free from the dunnage bag attacher.

Other features and advantages of the present disclosure will be apparent from the detailed description and the drawings.

DETAILED DESCRIPTION

Figure 1:
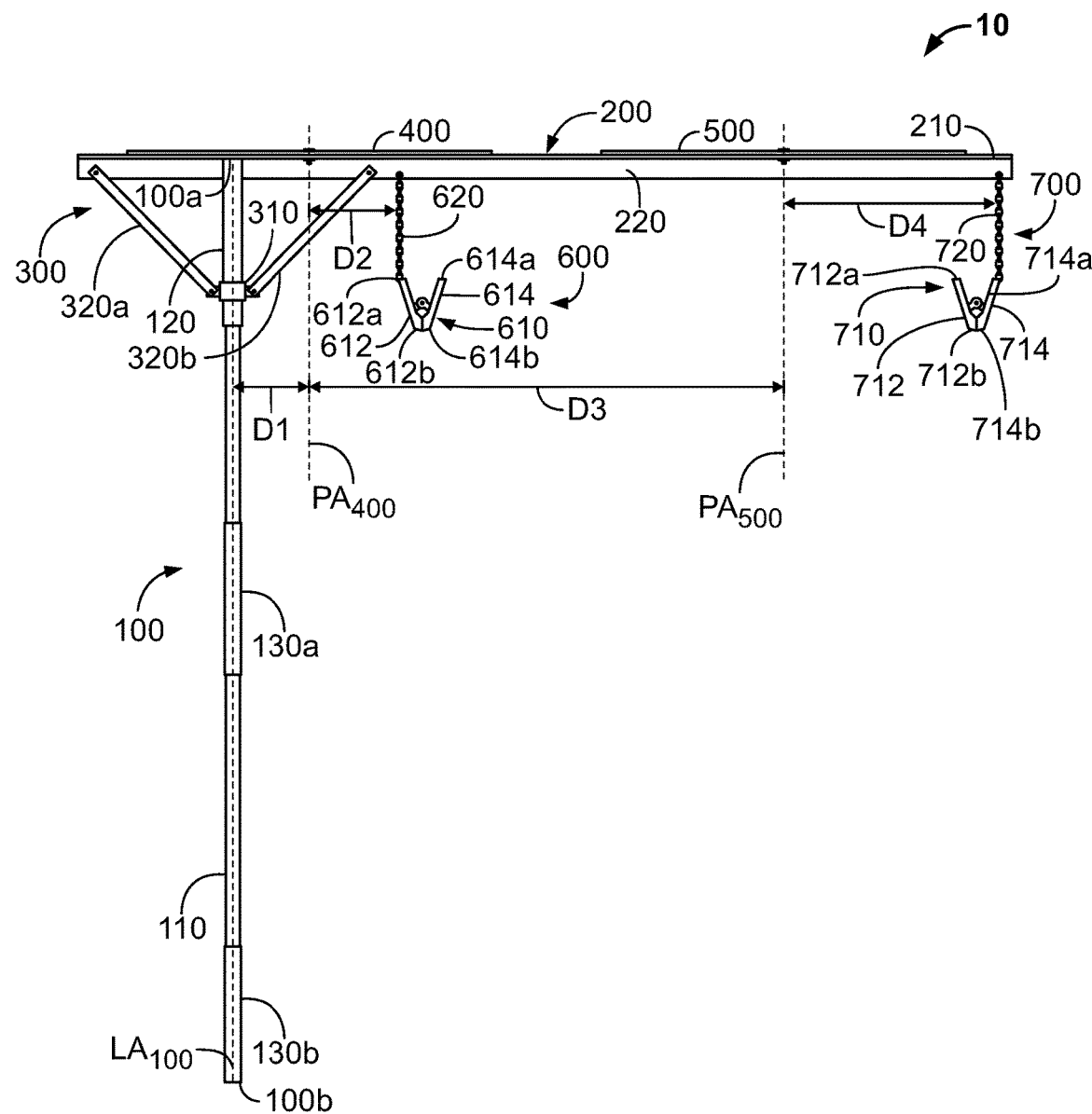
FIG. 1 is a front elevational view of one example embodiment of the dunnage bag suspender of the present disclosure with both supports in the stowed configuration.
Figure 2:
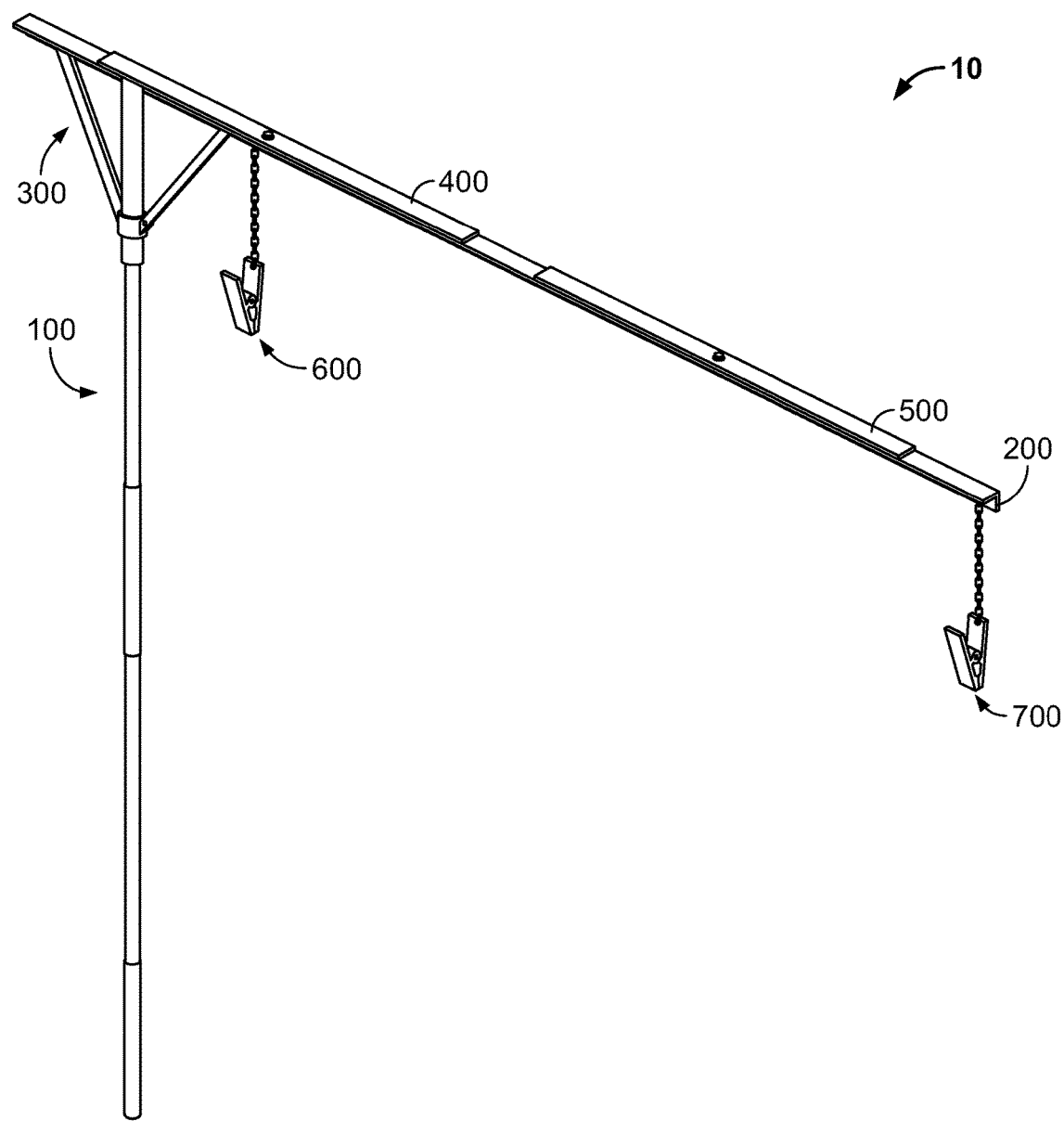
FIG. 2 is a perspective view of the dunnage bag suspender of FIG. 1 with both supports in the stowed configuration.

Various embodiments of the present disclosure provide a dunnage bag suspender configured to suspend a dunnage bag inplace before inflation and to hold the dunnage bag such that the dunnage bag can automatically pull free of the dunnage bag suspender during inflation.

FIGS. 1-4 illustrate one embodiment of the dunnage bag suspender 10 of the present disclosure. The dunnage bag suspender 10 includes: a handle 100 having a longitudinal axis $LA_{100}$, a support 200 having a longitudinal axis $LA_{200}$, an attachment assembly 300 including a collar 310 and first and second braces 320a and 320b, a first suspender 400 having a longitudinal axis $LA_{400}$, a second suspender 500 having a longitudinal axis $LA_{500}$, a first dunnage bag attachment assembly 600, and a second dunnage bag attachment assembly 700.

The handle 100 includes a cylindrical first handle portion 110 and cylindrical second handle portion 120. A cushioned grip 130 is wrapped around a portion of the first handle portion 110. One end of the first handle portion 110 is received in a bore defined in one end of the second handle portion 120, and these ends of the first and second handle portions 110 and 120 are fixedly connected to one another via one or more fasteners or in any other suitable manner. The end of the second handle portion 120 that isn't attached to the first handle portion 110 forms an attached end 100a of the handle 100. The end of the first handle portion 110 that isn't attached to the second handle portion 120 forms a free end 100b of the handle 100. The attached end 100a of the handle 100 defines a support receiving channel (not labeled) sized and shaped to receive a portion of the support 200, as described below.

In other embodiments, the handle is a single unitary component rather than formed by multiple components attached together. In certain embodiments, one end of the second handle portion is received in a bore defined in one end of the first handle portion (rather than the opposite configuration shown in FIGS. 1-4). In various embodiments, the length of the handle is adjustable between a first length and a second longer length. For instance, in certain embodiments the handle is telescoping and movable between a collapsed configuration having a first length and an extended configuration having a second, longer length.

The support 200 includes a top wall 210 connected to a side wall 220 to form a generally L-shaped cross-section (though the support may take any suitable shape). The top wall 210 and the side wall 220 are integrally formed in this embodiment (though they may be separate components attached together in other embodiments). The support 200 is fixedly attached to the handle 100 such that the longitudinal axis $LA_{100}$ of the handle 100 and the longitudinal axis $LA_{200}$ of the support 200 are transverse (here, perpendicular). Specifically, a portion of the side wall 220 is received in the support receiving channel of the attached end 100a of the handle 100. The collar 310 is fixedly attached to the handle 100 (and particularly the second handle portion 120) via suitable fasteners (though in other embodiments any suitable manner of attachment may be employed), and the first and second braces 320a and 320b are fixedly attached to the collar 310 and to the side wall 220. This is merely one example manner of attaching the support 200 to the handle 100, and any other suitable manner of attachment may be employed.

In certain embodiments, the support is pivotably attached to the handle such that the support can pivot relative to the handle between a use position in which the handle and the support longitudinal axes are transverse (such as perpendicular) and a stowed position in which the handle and the support longitudinal axes are parallel (or substantially parallel). The dunnage bag suspender may include a suitable locking device, such as a spring-loaded pin and corresponding opening, that locks the support in the stowed or the use position.

The first suspender 400 includes a rectangular cuboid having a length of 24 inches, a width of 1 inch, and a thickness of 0.25 inches (though other embodiments may have different dimensions and/or shapes). The longitudinal midpoint of the first suspender 400 is pivotably attached to the top wall 210 of the support 200 such that the first suspender 400 is pivotable relative to the support 200 and about a pivot axis $PA_{400}$ between: (1) a stowed position (FIGS. 1 and 2) in which its longitudinal axis $LA_{400}$ is parallel (or substantially parallel) to the longitudinal axis $LA_{200}$ of the support 200; and (2) a use configuration (FIGS. 3 and 4) in which its longitudinal axis $LA_{400}$ is transverse (here, perpendicular) to the longitudinal axis $LA_{200}$ of the support 200. In this illustrated embodiment, the first suspender 400 is attached to the top wall 210 of the support 200 via a pivot pin (not labeled), though any suitable manner of attachment may be used in other embodiments.

In other embodiments, the first suspender is movable, but not necessarily pivotable, between a stowed position and a use position. In one embodiment, the first suspender is telescopic and movable between a stowed position in which the first suspender is in a collapsed configuration and a use position in which the first suspender is in an extended configuration. In both configurations, the longitudinal axis of the first suspender is transverse to (such as perpendicular to) the longitudinal axis of the support.

In other embodiments, the first suspender is fixedly attached to the support such that the first suspender cannot (or cannot substantially) move longitudinally, pivotably, or any other way relative to the support.

The second suspender 500 includes a rectangular cuboid having a length of 24 inches, a width of 1 inch, and a thickness of 0.25 inches (though other embodiments may have different dimensions and/or shapes). The longitudinal midpoint of the second suspender 500 is pivotably attached to the top wall 210 of the support 200 such that the second suspender 500 is pivotable relative to the support 200 and about a pivot axis $PA_{500}$ between: (1) a stowed position (FIG. 1) in which its longitudinal axis $LA_{500}$ is parallel (or substantially parallel) to the longitudinal axis $LA_{200}$ of the support 200; and (2) a use configuration (FIG. 2) in which its longitudinal axis $LA_{500}$ is transverse (here, perpendicular) to the longitudinal axis $LA_{200}$ of the support 200. In this illustrated embodiment, the second suspender 500 is attached to the top wall 210 of the support 200 via a pivot pin (not labeled), though any suitable manner of attachment may be used in other embodiments.

In other embodiments, the second suspender is movable, but not necessarily pivotable, between a stowed position and a use position. In one embodiment, the second suspender is telescopic and movable between a stowed position in which the second suspender is in a collapsed configuration and a use position in which the second suspender is in an extended configuration. In both configurations, the longitudinal axis of the second suspender is transverse to (such as perpendicular to) the longitudinal axis of the support.

In other embodiments, the second suspender is fixedly attached to the support such that the second suspender cannot (or cannot substantially) move longitudinally, pivotably, or any other way relative to the support.

In this embodiment, the first and second suspenders 400 and 500 are identical, but in other embodiments the first and second suspenders differ. Other embodiments may include different quantities of suspenders, such as three or more suspenders. Some embodiments include a single suspender of sufficient width to support the dunnage bag during inflation (as described below).

In this embodiment, the pivot axes $PA_{400}$ and $PA_{500}$ are parallel (or substantially parallel) to the longitudinal axis $LA_{100}$ of the handle 100 and transverse (here, perpendicular) to the longitudinal axis $LA_{200}$ of the support 200. Also, in this embodiment the pivot axis $PA_{400}$ is spaced apart a distance D1 from the longitudinal axis $LA_{100}$ of the handle 100. Further, in this embodiment, the pivot axes $PA_{400}$ and $PA_{500}$ are parallel (or substantially parallel) and spaced apart a distance D3. Here, the distance D1 is 5.25 inches and the distance D3 is 31 inches, though these distances may be any suitable values in other embodiments. In this embodiment, the pivot axes $PA_{400}$ and $PA_{500}$ are spaced apart such that the first and second suspenders 400 and 500 do not contact one another when they are both in the stowed configuration. That is, in this embodiment, the distance D3 is greater than the sum of half of the length of the first suspender 400 and half of the length of the second suspender 500.

In this embodiment, the first and second suspenders are fixedly attached to the support such that the suspenders cannot (or cannot substantially) move longitudinally relative to the support. In other embodiments one (or more) of the suspenders is movably attached to the support such that the suspender can move relative to the support along the longitudinal axis of the support (i.e., toward and away from the handle). This enables an operator to vary the distance between the suspenders to accommodate for larger or smaller loads. In these embodiments, the dunnage bag suspender includes a suitable locking device engageable to lock the movable suspender inplace relative to the support such that the suspender cannot (or cannot substantially) move longitudinally relative to the support.

The first dunnage bag attachment assembly 600 includes a first dunnage bag attacher 610 and a first hanger 620. The first dunnage bag attacher 610 includes a spring clamp that includes a first lever arm 612 pivotably connected to a second lever arm 614 via a pivot pin (not labeled) that defines a pivot axis (not labeled). The first lever arm 612 includes a first handle end 612a and an opposing first jaw end 612b Similarly, the second lever arm 614 includes a second handle end 614a and an opposing second jaw end 614b. The first and second lever arms 612 and 614 are pivotable relative to one another about the pivot axis between: (1) an open configuration (not shown) in which the first and second handle ends 612a and 614a either contact one another or are spaced apart a first distance and the first and second jaw ends 612b and 614b are spaced apart from one another; and (2) a closed configuration (FIGS. 1-4) in which the first and second handle ends 612a and 614a are spaced apart from one another a second greater distance and the first and second jaw ends 612b and 614b contact one another. A biasing element (not labeled), here a torsion spring, biases the first and second lever arms to the closed configuration.

In this embodiment, the biasing element is configured such that the first and second jaw ends 612b and 614b impose a clamping force of 25 pounds. In other embodiments, the clamping force may be a different value large enough to retain the dunnage bag before inflation but small enough to enable the dunnage bag to pull free of the first dunnage bag attacher during inflation, as described below. In various embodiments, the clamping force is between 25 and 65 pounds.

In other embodiments, the first dunnage bag attacher may be any other suitable attachment mechanism, such as an adhesive patch or a set of magnetic jaws.

Additionally, in this example embodiment, the first hanger 620 includes a non-rigid member in the form of a chain, though it may include any other suitable component such as a fabric or wire rope. In this example embodiment, the first hanger 620 has a length of 6 inches, though in other embodiments it may have any suitable length. In some embodiments, the length of the first hanger is adjustable.

One end of the first hanger 620 is fixedly attached to the side wall 220 of the support 200 a distance D2 from the pivot axis $PA_{400}$ of the first suspender 400 such that the first hanger 620 cannot (or cannot substantially) move longitudinally relative to the support 200. In this embodiment, D2 is 7 inches, though this distance may be any suitable value in other embodiments. The other end of the first hanger 620 is attached to the first dunnage bag attacher 610. When not in use, the first dunnage bag attacher 610 can be clamped to the side wall 220 of the support 200.

The second dunnage bag attachment assembly 700 includes a second dunnage bag attacher 710 and a second hanger 720. The second dunnage bag attacher 710 includes a spring clamp that includes a first lever arm 712 pivotably connected to a second lever arm 714 via a pivot pin (not labeled) that defines a pivot axis (not labeled). The first lever arm 712 includes a first handle end 712a and an opposing first jaw end 712b Similarly, the second lever arm 714 includes a second handle end 714a and an opposing second jaw end 714b. The first and second lever arms 712 and 714 are pivotable relative to one another about the pivot axis between: (1) an open configuration (not shown) in which the first and second handle ends 712a and 714a either contact one another or are spaced apart a first distance and the first and second jaw ends 712b and 714b are spaced apart from one another; and (2) a closed configuration (FIGS. 1-4) in which the first and second handle ends 712a and 714a are spaced apart from one another a second greater distance and the first and second jaw ends 712b and 714b contact one another. A biasing element (not labeled), here a torsion spring, biases the first and second lever arms to the closed configuration.

In this embodiment, the biasing element is configured such that the first and second jaw ends 712b and 714b impose a clamping force of 25 pounds. In other embodiments, the clamping force may be a different value large enough to retain the dunnage bag before inflation but small enough to enable the dunnage bag to pull free of the second dunnage bag attacher during inflation, as described below. In various embodiments, the clamping force is between 25 and 65 pounds.

In other embodiments, the second dunnage bag attacher may be any other suitable attachment mechanism, such as an adhesive patch or a set of magnetic jaws.

Additionally, in this example embodiment, the second hanger 720 includes a non-rigid member in the form of a chain, though it may include any other suitable component such as a fabric or wire rope. In this example embodiment, the second hanger 720 has a length of 6 inches, though in other embodiments it may have any suitable length. In some embodiments, the length of the second hanger is adjustable.

One end of the second hanger 720 is fixedly attached to the side wall 220 of the support 200 a distance D4 from the pivot axis $PA_{500}$ of the second suspender 500 such that the second hanger 720 cannot (or cannot substantially) move longitudinally relative to the support 200. In this embodiment, D4 is 12 inches, though this distance may be any suitable value in other embodiments. The other end of the second hanger 720 is attached to the first dunnage bag attacher 710. When not in use, the second dunnage bag attacher 710 can be clamped to the side wall 220 of the support 200.

In other embodiments one (or more) of the hangers is movably attached to the support such that the hanger can move relative to the support along the longitudinal axis of the support (i.e., toward and away from the handle). This enables an operator to vary the distance between the hangers—and thus the dunnage bag attachers—to accommodate for larger or smaller dunnage bag widths. In these embodiments, the dunnage bag suspender includes a suitable locking device engageable to lock the movable hanger inplace relative to the support such that the hanger cannot (or cannot substantially) move longitudinally relative to the support.

In other embodiments, one or more of the hangers are each rigid members.

In other embodiments, one (or more) of the dunnage bag attachers is directly attached to the support as opposed to indirectly via a hanger.

In various embodiments, the dunnage bag suspender includes a manual release device that includes an actuator and one or more mechanical linkages (such as one or more wires) that operably connect the actuator to the dunnage bag attachers such that actuation of the actuators causes the dunnage bag attachers to move to their corresponding open configurations. This enables an installer to manually actuate the actuator to open the dunnage bag attachers during installation, such as in response to the dunnage bag not pulling free from the dunnage bag attachers during inflation.

The following in conjunction with FIGS. 3-7 is an example method of using the dunnage bag suspender 10 to suspend a dunnage bag 700 in a space between a first stack of palletized goods 800a and a second stack of palletized goods 800b during inflation.

Figure 3:
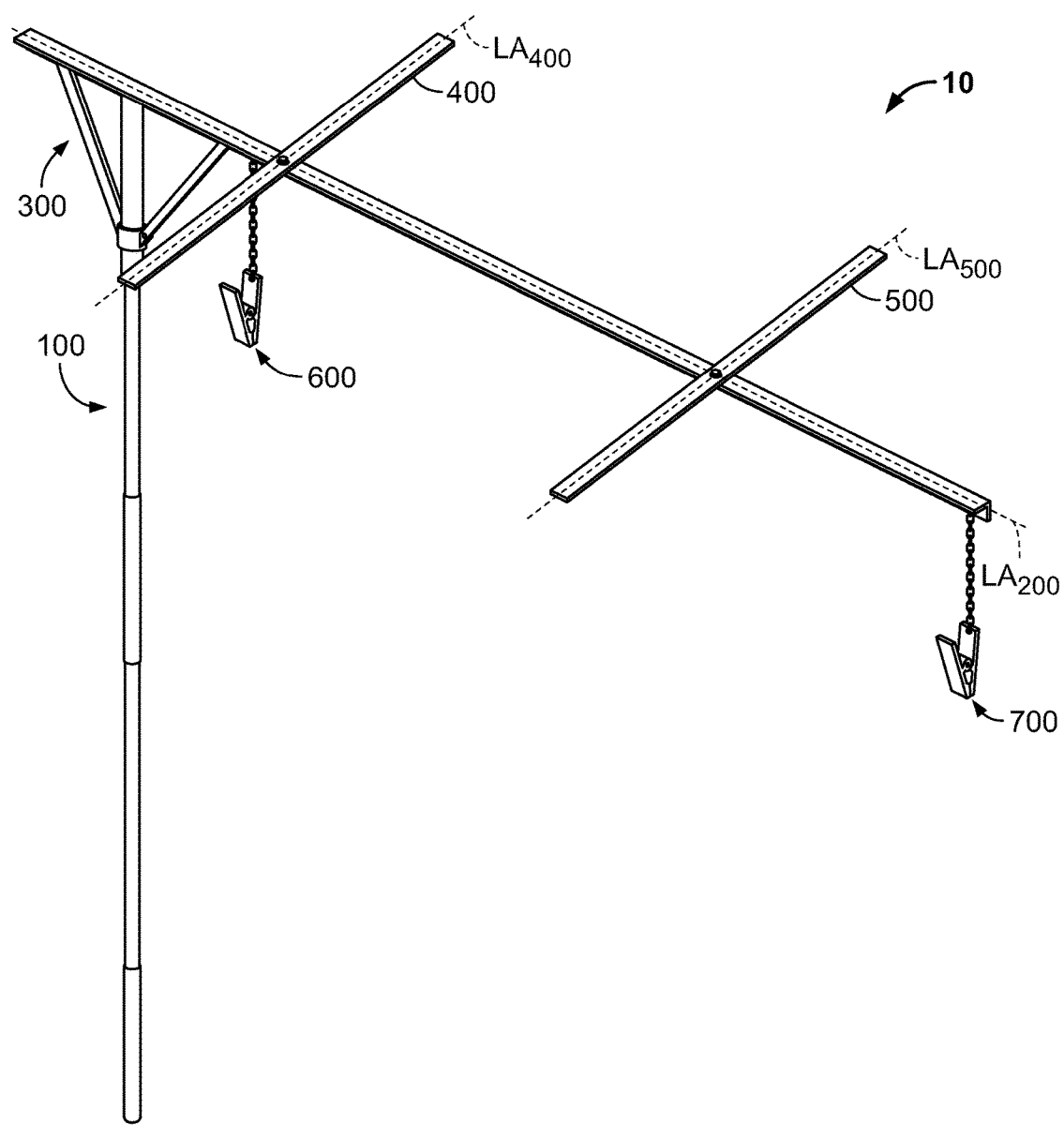
FIG. 3 is a perspective view of the dunnage bag suspender of FIG. 1 with both supports in the use configuration.

First, as shown in FIG. 3, the installer manipulates the first and second suspenders 400 and 500 from their stowed configurations to their use configurations.

Figure 4:
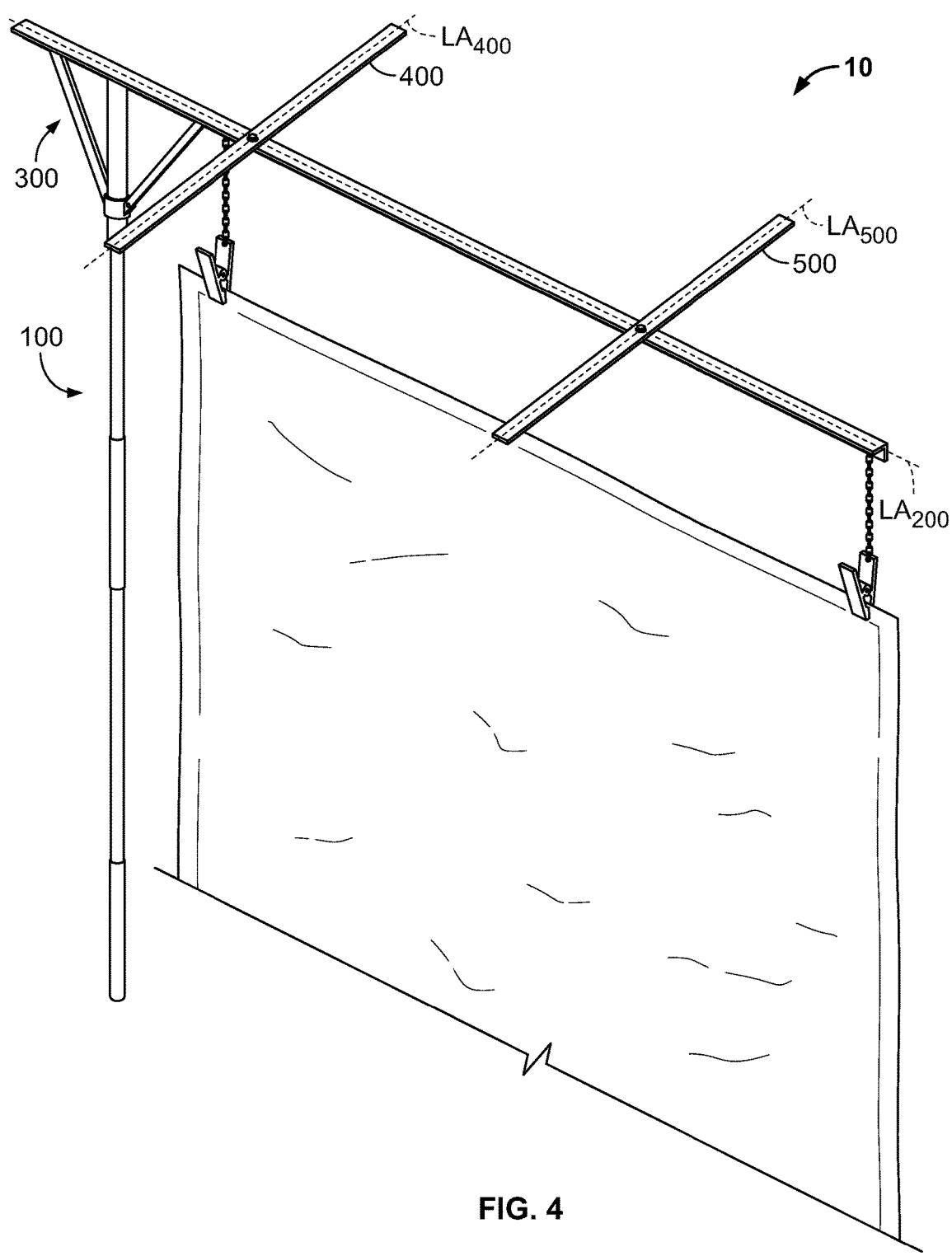
FIG. 4 is a perspective view of the dunnage bag suspender of FIG. 1 with both supports in the use configuration and a deflated dunnage bag releasably attached to the dunnage bag attachers.

Second, as shown in FIG. 4, the installer releasably attaches the first and second dunnage bag attachers 610 and 710 to one end of the deflated dunnage bag 700 by, for each dunnage bag attacher: (1) squeezing the handle ends of the lever arms of that dunnage bag attacher together to manipulate that dunnage bag attacher to its open configuration; (2) inserting the end of the dunnage bag into the space between the jaw ends of that dunnage bag attacher; and (3) releasing the handle ends of the lever arms of that dunnage bag attacher such that the biasing element biases the lever arms back to their closed configuration, thereby clamping the end of the deflated dunnage bag between the jaw ends of the lever arms.

Figure 5:
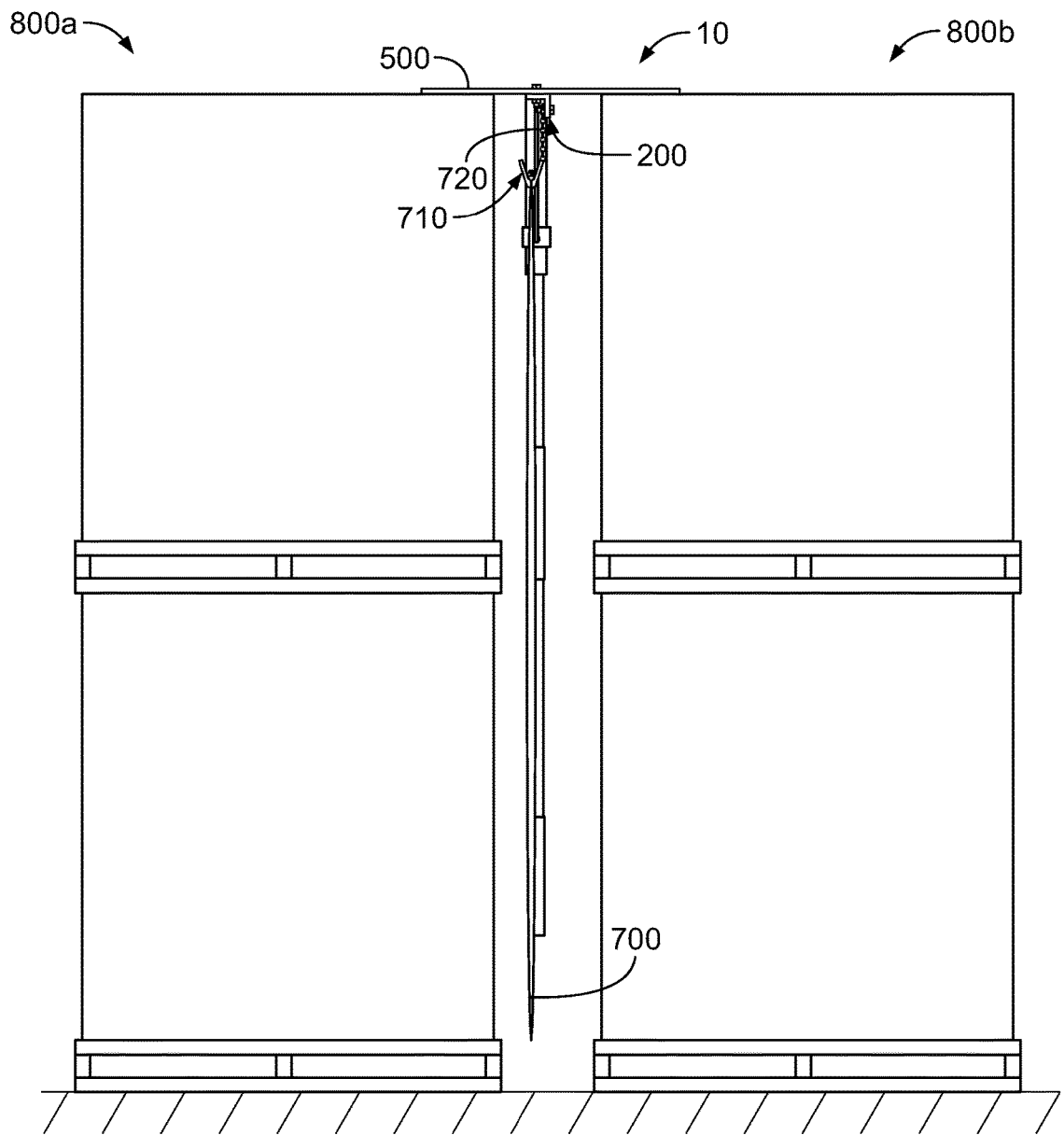
FIG. 5 is a side elevational view of the dunnage bag suspender of FIG. 1 suspending a deflated dunnage bag in a space between adjacent stacks of palletized goods.
Figure 6:
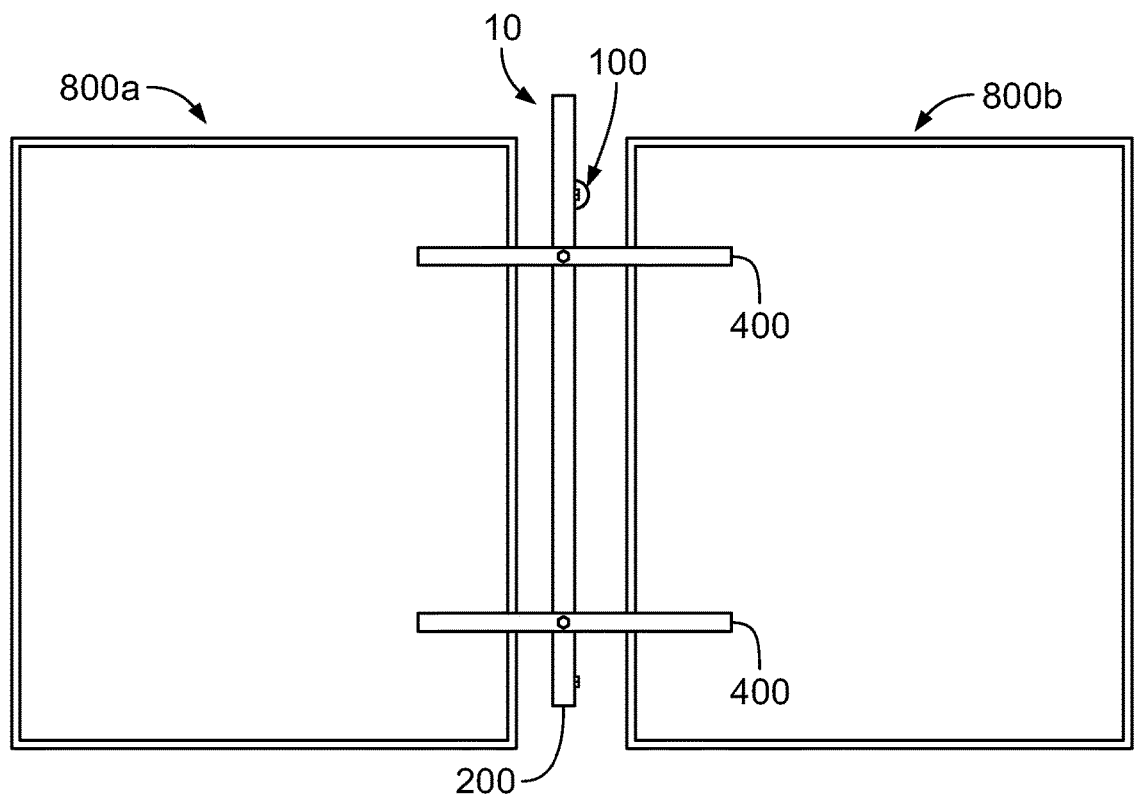
FIG. 6 is a top plan view of the scene shown in FIG. 5.

Third, as best shown in FIGS. 5 and 6, the installer uses the handle 100 to position the dunnage bag suspender 10 such that the first and second suspenders 400 and 500 each contact the top surfaces of the stacks of palletized goods 800a and 800b, the first and second suspenders 400 and 500 each extend across the space between the stacks of palletized goods 800a and 800b, and the deflated dunnage bag 700 hangs from the first and second dunnage bag attachers 610 and 710 in the space between the stacks of palletized goods 800a and 800b. At this point, suspenders 400 and 500 support the dunnage bag suspender 10, and the installer can release the dunnage bag suspender 10.

Figure 7:
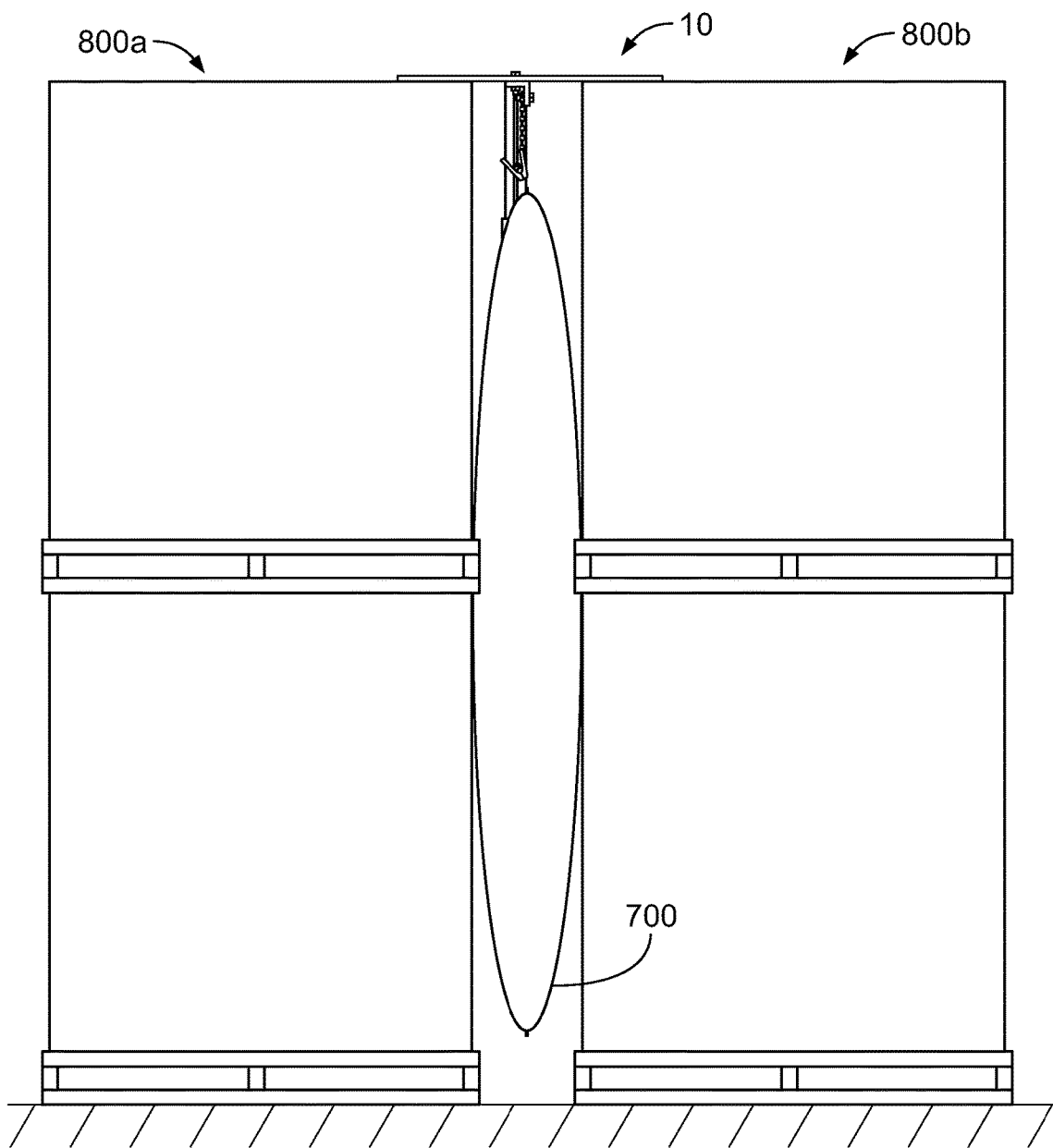
FIG. 7 is a side elevational view of the dunnage bag of FIG. 5 after inflation and after it has pulled free from the dunnage bag suspender.

Fourth, the installer attaches an inflator head (not shown) in fluid communication with a compressed air source to a valve of the dunnage bag (not shown). The installer then inflates the dunnage bag 700 to a desired operating pressure. As the dunnage bag 700 inflates, it expands laterally (horizontally as shown in FIGS. 5 and 7) to fill the space between the stacks of palletized goods 800a and 800b while shrinking longitudinally (vertically as shown in FIGS. 5 and 7). At some point before the dunnage bag 700 reaches the desired operating pressure, the dunnage bag 700 shrinks longitudinally to a degree such that the dunnage bag 700 pulls free from the first and second dunnage bag attachers 610 and 710, as shown in FIG. 6. Put differently, the dunnage bag attachers 610 and 710 impose a clamping force large enough to retain the dunnage bag before inflation but small enough to enable the dunnage bag to pull free without damage during inflation.

Fifth, after the dunnage bag 700 reaches the designated operating pressure and has pulled free of the dunnage bag attachers 610 and 710, the installer uses the handle 100 to remove the dunnage bag suspender 10 from the stacks of palletized goods 800a and 800b, and can (if desired) repeat the above steps for another dunnage bag and another pair of stacks of palletized goods. Alternatively, if the dunnage bag does not pull free of the dunnage bag attachers during inflation, the installer imposes an upward force on the handle 100 to manually pull the dunnage bag attachers 610 and 710 off of the dunnage bag. The force the inflated dunnage bag imposes on the opposing stacks of palletized goods holds it inplace while the installer pulls the dunnage bag attacher off of it.

The dunnage bag suspender solves the above problems by streamlining the positioning and inflation of dunnage bags that must be suspended above the floor of a shipping container. A single installer can use the dunnage bag suspender to suspend the dunnage bag above the floor in the desired position and then inflate the dunnage bag to cause it to pull free from the dunnage bag suspender. There is no need for a second installer to hold the dunnage bag inplace during inflation. There is also no need to climb atop the load to detach the dunnage bag from the dunnage bag suspender—that occurs automatically due to the clamping force of the dunnage bag attachers and the length of the non-rigid members that attach the dunnage bag attachers to the support. Further, the dunnage bag suspender is usable with any dunnage bag wide enough to be attached to the dunnage bag attachers, without any special modifications.

Figure 8:
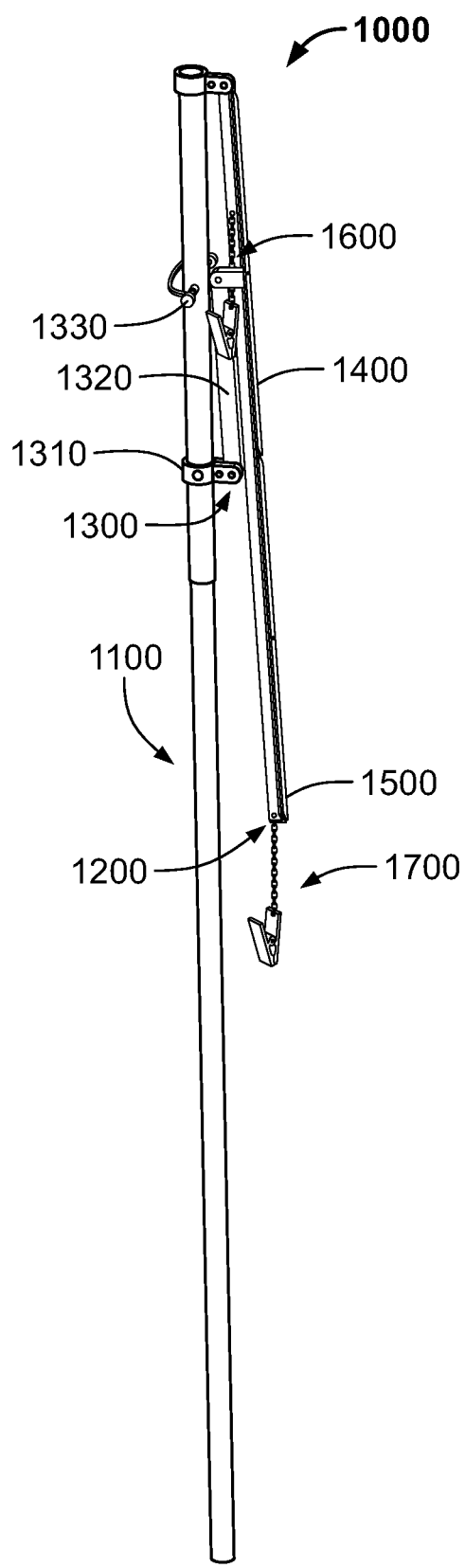
FIG. 8 is a perspective view of another example embodiment of the dunnage bag suspender of the present disclosure in a stowed position.
Figure 9:
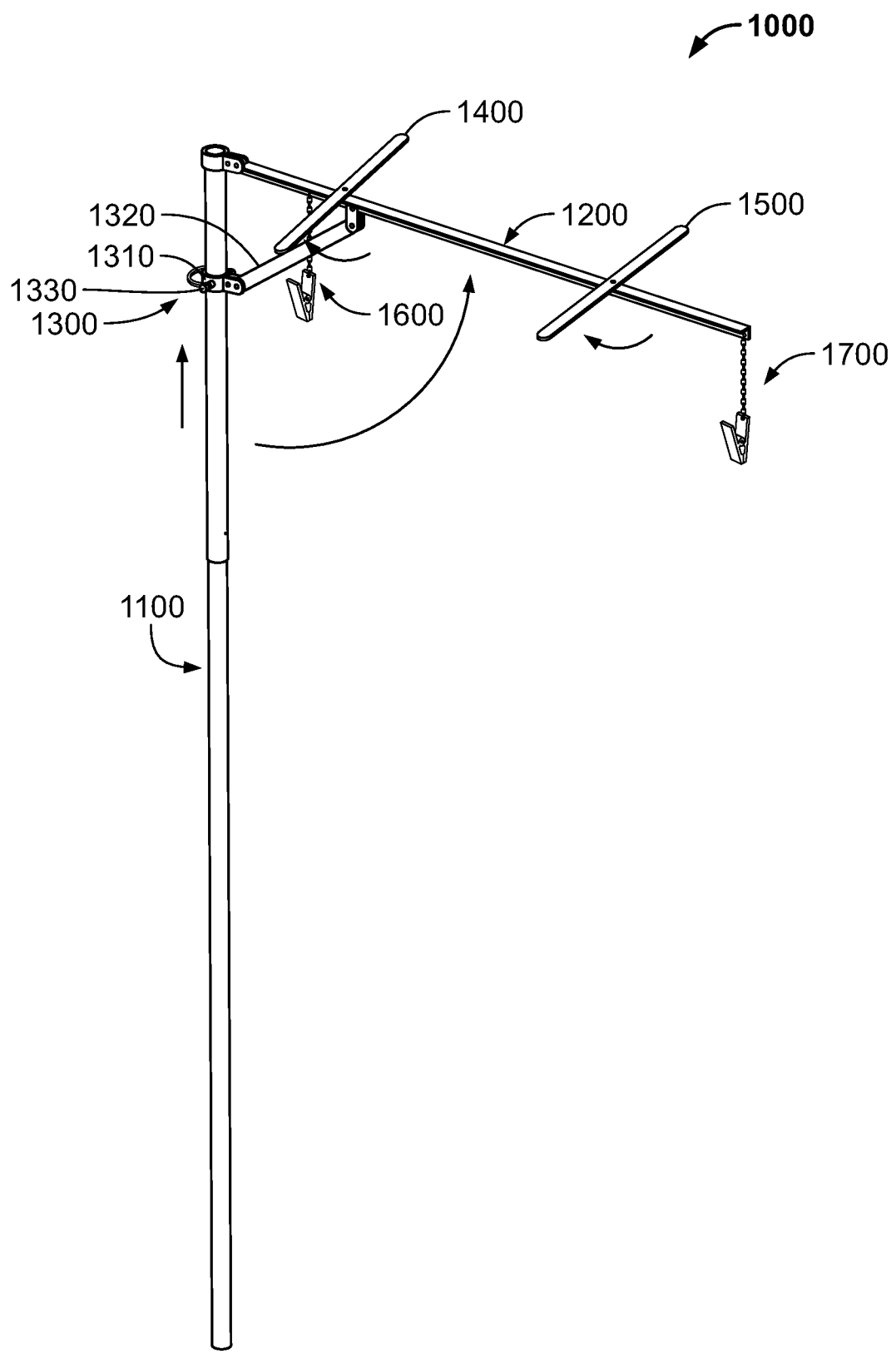
FIG. 9 is a perspective view of the dunnage bag suspender of FIG. 8 with the supports in the use configuration.

FIGS. 8 and 9 illustrate another embodiment of the dunnage bag suspender 1000 of the present disclosure that's movable between a folded configuration (FIG. 8) and an unfolded configuration (FIG. 9). The dunnage bag suspender 1000 includes: a handle 1100, a support 1200, an attachment assembly 1300, a first suspender 1400, a second suspender 1500, a first dunnage bag attachment assembly 1600, and a second dunnage bag attachment assembly 1700. The handle 1100, the support 1200, the first suspender 1400, the second suspender 1500, the first dunnage bag attachment assembly 1600, and the second dunnage bag attachment assembly 1700 are similar or identical to the 100, the support 200, the first suspender 400, the second suspender 500, the first dunnage bag attachment assembly 600, and the second dunnage bag attachment assembly 700 described above.

The attachment assembly includes a collar 1310, a connector 1320, and a locking device 1330. The collar 1310 is slidably mounted to the handle 1100 and movable relative to the handle 1100 between a folded position (FIG. 8) and an unfolded position (FIG. 9). A first end of the connector 1320 is fixedly attached to the collar 1310 and a second end of the connector 1320 is fixedly attached to the support 1200. The connector 1320 is movable between a folded position (FIG.

8) and an unfolded position (FIG. 9) via movement of the collar 1310 between the folded and unfolded positions. The locking device 1330 includes a pin configured to attach the collar 1310 to the handle 1100 (by sliding into aligned bores defined through those components) when the collar 1310 is in the unfolded position to lock the dunnage bag suspender 1000 in the unfolded configuration.

In certain embodiments, the dunnage bag suspender includes a suitable component, such as a base attached to the bottom of the handle, configured to support the dunnage bag suspender upright when placed on the ground. In some of these embodiments, the dunnage bag suspender does not include the first and second suspenders. In operation, the base is placed on the ground and holds the handle upright such that the dunnage bag is held inplace between the stacks of palletized goods during inflation. That is, in this embodiment, the dunnage bag suspender does not hold the dunnage bag inplace by resting suspenders atop the stacks of palletized goods, but rather by supporting the handle and support from beneath via the base.

In other embodiments, the dunnage bag suspender is configured to removably attach to the sides of the stacks of palletized goods, such as via an adhesive or other mechanical friction. In some of these embodiments, the dunnage bag suspender does not include the first and second suspenders. In operation, the dunnage bag suspender is attached to the sides of the stacks of palletized goods such that the handle is held upright and the dunnage bag is held inplace between the stacks of palletized goods during inflation. That is, in this embodiment, the dunnage bag suspender does not hold the dunnage bag inplace by resting suspenders atop the stacks of palletized goods, but rather by supporting the handle and support via attachment to the sides of the stacks of palletized goods.

Thus, in various embodiments, the present disclosure provides a dunnage bag suspender comprising: a handle; a support attached to the handle and having a support longitudinal axis; a first suspender that has a first suspender longitudinal axis, wherein the first suspender is pivotably attached to the support such that the first suspender is pivotable relative to the support between a first stowed configuration and a first use configuration, wherein when the first suspender is in the first use configuration the first suspender longitudinal axis is transverse to the support longitudinal axis; and a first dunnage bag attacher attached to the support and configured to releasably attach to a dunnage bag.

In various such embodiments of the dunnage bag suspender, when the first suspender is in the first use configuration, the first suspender longitudinal axis is perpendicular to the support longitudinal axis.

In various such embodiments of the dunnage bag suspender, when the first suspender is in the first stowed configuration, the first suspender longitudinal axis is parallel to the support longitudinal axis.

In various such embodiments of the dunnage bag suspender, the first suspender is pivotable about a pivot axis parallel to a handle longitudinal axis of the handle.

In various such embodiments of the dunnage bag suspender, the dunnage bag suspender further comprises a first hanger that attaches the first dunnage bag attacher to the support.

In various such embodiments of the dunnage bag suspender, the first dunnage bag attacher is movable between a first open configuration and a first closed configuration, and wherein the dunnage bag suspender further comprises a first biasing element that biases the first dunnage bag attacher to the first closed configuration.

In various such embodiments of the dunnage bag suspender, the first biasing element is configured such that the first dunnage bag attacher imposes a clamping force between 25 and 65 pounds when in the first closed configuration.

In various such embodiments of the dunnage bag suspender, the dunnage bag suspender further comprises a second suspender that defines a second suspender longitudinal axis, wherein the second suspender is pivotably attached to the support such that the second suspender is pivotable relative to the support between a second stowed configuration and a second use configuration, wherein when the second suspender is in the second use configuration the second suspender longitudinal axis is transverse to the support longitudinal axis.

In various such embodiments of the dunnage bag suspender, the dunnage bag suspender further comprises a second dunnage bag attacher attached to the support and configured to releasably attach to the dunnage bag.

In various such embodiments of the dunnage bag suspender, the first suspender is pivotable about a first pivot axis; the second suspender is pivotable about a second pivot axis; and the first pivot axis, the second pivot axis, and a handle longitudinal axis of the handle are parallel.

In various such embodiments of the dunnage bag suspender, when the first and second suspenders are in their respective first and second use configurations, the first and second suspender longitudinal axes are perpendicular to their respective support longitudinal axis.

In various such embodiments of the dunnage bag suspender, when the first and second suspenders are in their respective first and second suspender stowed configurations, the first and second suspender longitudinal axes are parallel to the support longitudinal axis.

In various such embodiments of the dunnage bag suspender, the first dunnage bag attacher is movable between a first open configuration and a first closed configuration, wherein the dunnage bag suspender further comprises a first biasing element that biases the first dunnage bag attacher to the first closed configuration, wherein the second dunnage bag attacher is movable between a second open configuration and a second closed configuration, and wherein the dunnage bag suspender further comprises a second biasing element that biases the second dunnage bag attacher to the second closed configuration.

In various such embodiments of the dunnage bag suspender, the first biasing element and the second biasing element are configured such that the first and second dunnage bag attachers each impose a clamping force between 25 and 65 pounds when in their respective closed configurations.

In various other embodiments, the present disclosure also provides a dunnage bag suspender comprising: a handle; a support attached to the handle; a first suspender attached to the support; and a first dunnage bag attacher attached to the support and configured to releasably attach to an at least partially deflated dunnage bag via imposition of first clamping force onto the dunnage bag, wherein the first clamping force is low enough to enable the dunnage bag to pull free from the first dunnage bag attacher during inflation.

In various such embodiments of the dunnage bag suspender, the dunnage bag suspender further comprises a first hanger that attaches the first dunnage bag attacher to the support.

In various such embodiments of the dunnage bag suspender, the first dunnage bag attacher is movable between a first open configuration and a first closed configuration, and wherein the dunnage bag suspender further comprises a first biasing element that biases the first dunnage bag attacher to the first closed configuration.

In various such embodiments of the dunnage bag suspender, the first biasing element is configured such that the first dunnage bag attacher imposes the first clamping force.

In various such embodiments of the dunnage bag suspender, the first clamping force is between 25 and 65 pounds.

In various such embodiments of the dunnage bag suspender, the dunnage bag suspender further comprises a second dunnage bag attacher attached to the support and configured to releasably attach to the at least partially deflated dunnage bag via imposition of a second clamping force onto the dunnage bag, wherein the second clamping force is low enough to enable the dunnage bag to pull free from the second dunnage bag attacher during inflation.

In various other embodiments, the present disclosure further provides a method of installing a dunnage bag in a space between a first portion of a load and a second portion of a load, the method comprising: moving a first suspender of a dunnage bag suspender from a first stowed configuration to a first use configuration; releasably attaching a first dunnage bag attacher of the dunnage bag suspender to the dunnage bag; and positioning the dunnage bag suspender such that the first suspender rests a top surface of the first portion of the load and a top surface of the second portion of the load, the first suspender extends across the space between the first and second portions of the load, and the dunnage bag is positioned in the space between the first and second portions of the load.

In various such embodiments of the method, the method further comprises inflating the dunnage bag to a desired operating pressure, the inflating causing the dunnage bag to pull free from the first dunnage bag attacher.

In various such embodiments of the method, the dunnage bag suspender further comprises a handle and a support attached to the handle, wherein the first suspender is pivotably attached to the support, wherein manipulating the first suspender from the first stowed configuration to the first use configuration further comprises pivoting the first suspender relative to the support from the first stowed configuration to the first use configuration.

In various such embodiments of the method, the method further comprises moving a second suspender of the dunnage bag suspender from a second stowed configuration to a second use configuration.

In various such embodiments of the method, the method further comprises releasably attaching a second dunnage bag attacher of the dunnage bag suspender to the dunnage bag.

In various such embodiments of the method, the first dunnage bag attacher comprises a first biasing element that biases the first dunnage bag attacher to a first closed configuration, wherein the first biasing element is configured such that the first dunnage bag attacher imposes a clamping force between 25 and 65 pounds when in the first closed configuration, wherein attaching the first dunnage bag attacher to the dunnage bag comprises manipulating the first dunnage bag attacher to a first open configuration, inserting part of the dunnage bag into a space between two jaw ends of the first dunnage bag attacher, and enabling the first biasing element to bias the first dunnage bag attacher to the first closed configuration, thereby clamping the dunnage bag between the jaw ends.

Various changes and modifications to the above-described embodiments described herein will be apparent to those skilled in the art. These changes and modifications can be made without departing from the spirit and scope of this present subject matter and without diminishing its intended advantages. Not all of the depicted components described in this disclosure may be required, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The invention claimed is:

1. A dunnage bag suspender comprising:
a handle;
a support attached to the handle and having a support longitudinal axis; and
a first dunnage bag attacher attached to the support and configured to releasably attach to a dunnage bag;
wherein the first dunnage bag attacher is configured to releasably attach to the dunnage bag via imposition of a first clamping force onto the dunnage bag, wherein the first clamping force is low enough to enable the dunnage bag to pull free from the first dunnage bag attacher during inflation.

2. The dunnage bag suspender of claim 1, further comprising a first hanger that attaches the first dunnage bag attacher to the support.

3. The dunnage bag suspender of claim 1, wherein the first dunnage bag attacher is movable between a first open configuration and a first closed configuration, and wherein the dunnage bag suspender further comprises a first biasing element that biases the first dunnage bag attacher to the first closed configuration.

4. The dunnage bag suspender of claim 3, wherein the first biasing element is configured such that the first dunnage bag attacher imposes a clamping force between 25 and 65 pounds when in the first closed configuration.

5. The dunnage bag suspender of claim 1, further comprising a first suspender that has a first suspender longitudinal axis, wherein the first suspender is movably attached to the support such that the first suspender is movable relative to the support between a first stowed configuration and a first use configuration, wherein when the first suspender is in the first use configuration the first suspender longitudinal axis is transverse to the support longitudinal axis.

6. The dunnage bag suspender of claim 5, wherein when the first suspender is in the first use configuration, the first suspender longitudinal axis is perpendicular to the support longitudinal axis.

7. The dunnage bag suspender of claim 5, wherein when the first suspender is in the first stowed configuration, the first suspender longitudinal axis is parallel to the support longitudinal axis.

8. The dunnage bag suspender of claim 5, wherein the first suspender is pivotable about a pivot axis parallel to a handle longitudinal axis of the handle between the first stowed configuration and the first use configuration.

9. The dunnage bag suspender of claim 5, further comprising a second suspender that defines a second suspender longitudinal axis, wherein the second suspender is movably attached to the support such that the second suspender is movable relative to the support between a second stowed configuration and a second use configuration, wherein when the second suspender is in the second use configuration the second suspender longitudinal axis is transverse to the support longitudinal axis.

10. The dunnage bag suspender of claim 9, further comprising a second dunnage bag attacher attached to the support and configured to releasably attach to the dunnage bag.

11. The dunnage bag suspender of claim 9, wherein the first suspender is pivotable about a first pivot axis between the first stowed configuration and the first use configuration; the second suspender is pivotable about a second pivot axis between the second stowed configuration and the second use configuration; and the first pivot axis, the second pivot axis, and a handle longitudinal axis of the handle are parallel.

12. The dunnage bag suspender of claim 11, wherein when the first and second suspenders are in their respective first and second use configurations, the first and second suspender longitudinal axes are perpendicular to their respective support longitudinal axis.

13. The dunnage bag suspender of claim 12, wherein when the first and second suspenders are in their respective first and second suspender stowed configurations, the first and second suspender longitudinal axes are parallel to the support longitudinal axis.

14. The dunnage bag suspender of claim 10, wherein the first dunnage bag attacher is movable between a first open configuration and a first closed configuration, wherein the dunnage bag suspender further comprises a first biasing element that biases the first dunnage bag attacher to the first closed configuration, wherein the second dunnage bag attacher is movable between a second open configuration and a second closed configuration, and wherein the dunnage bag suspender further comprises a second biasing element that biases the second dunnage bag attacher to the second closed configuration.

15. The dunnage bag suspender of claim 14, wherein the first biasing element and the second biasing element are each configured such that the first and second dunnage bag attachers each impose a clamping force between 25 and 65 pounds when in their respective closed configurations.

16. A method of installing a dunnage bag in a space between a first portion of a load and a second portion of a load, the method comprising:
releasably attaching a first dunnage bag attacher of a dunnage bag suspender to the dunnage bag;
positioning the dunnage bag suspender such that the dunnage bag is positioned in the space between the first and second portions of the load; and
inflating the dunnage bag to a desired operating pressure, the inflating causing the dunnage bag to pull free from the first dunnage bag attacher.

17. The method of claim 16, wherein positioning the dunnage bag suspender comprises positioning the dunnage bag suspender such that a first suspender of the dunnage bag suspender rests on a top surface of the first portion of the load and on a top surface of the second portion of the load and extends across the space between the first and second portions of the load.

18. The method of claim 17, wherein the dunnage bag suspender further comprises a handle and a support attached to the handle, wherein the first suspender is attached to the support and movable relative to the support between a first stowed configuration and a first use configuration.

19. The method of claim 17, further comprising moving the first suspender from the stowed configuration to the first use configuration and moving a second suspender of the dunnage bag suspender from a second stowed configuration to a second use configuration before dunnage bag suspender.

20. The method of claim 19, further comprising releasably attaching a second dunnage bag attacher of the dunnage bag suspender to the dunnage bag, wherein inflating the dunnage bag operating pressure causes the dunnage bag to pull free from the second dunnage bag attacher.

* * * * *